United States Patent [19]

Knapp et al.

[11] 4,040,254

[45] Aug. 9, 1977

[54] HYDROSTATIC TRANSMISSION WITH AUTOMATIC DISPLACEMENT SHIFTER

[75] Inventors: Kenneth K. Knapp, Battle Creek; William E. Koch, Marshall, both of Mich.

[73] Assignee: Eaton Corporation, Cleveland, Ohio

[21] Appl. No.: 670,333

[22] Filed: Mar. 25, 1976

[51] Int. Cl.² .......................................... B62D 11/04
[52] U.S. Cl. ..................................... 60/420; 60/484; 180/6.48
[58] Field of Search ............... 180/6.48; 60/420, 422, 60/430, 484, 490, 451

[56] References Cited

U.S. PATENT DOCUMENTS

| | | | |
|---|---|---|---|
| 2,161,439 | 6/1939 | Thoma | 60/451 |
| 2,941,365 | 6/1960 | Carlson | 60/451 X |
| 3,186,170 | 6/1965 | Gauthier et al. | 60/451 |

FOREIGN PATENT DOCUMENTS

| | | | |
|---|---|---|---|
| 941,736 | 11/1963 | United Kingdom | 180/6.48 |
| 966,692 | 8/1964 | United Kingdom | 180/6.48 |

*Primary Examiner*—Joseph F. Peters, Jr.
*Assistant Examiner*—John A. Pekar
*Attorney, Agent, or Firm*—Teagno & Toddy

[57] ABSTRACT

A hydrostatic transmission system is provided which is particularly well adapted for use in driving vehicles employing skid-steer drives. In the system disclosed two independent hydrostatic transmissions, each employing a variable displacement motor are utilized; and a pressure responsive valve is employed to sense the magnitude of the load on each of the motors and to permit shifting the motors from minimum displacement toward maximum upon the sensing of a load in excess of a predetermined valve. The variable displacement motors of the system are configured to create forces during operation tending to urge the motors to maximum displacement, and the pressure responsive valve operates to bias the motors to minimum displacement when they are loaded at a magnitude less than the predetermined valve.

4 Claims, 3 Drawing Figures

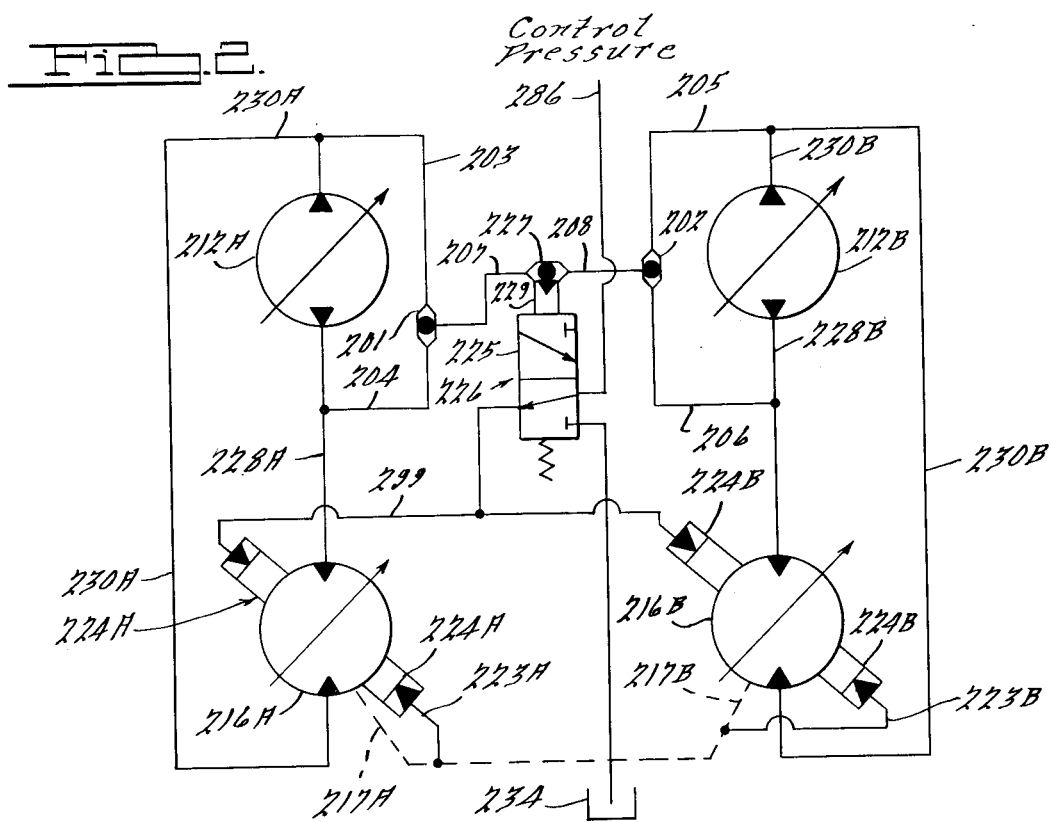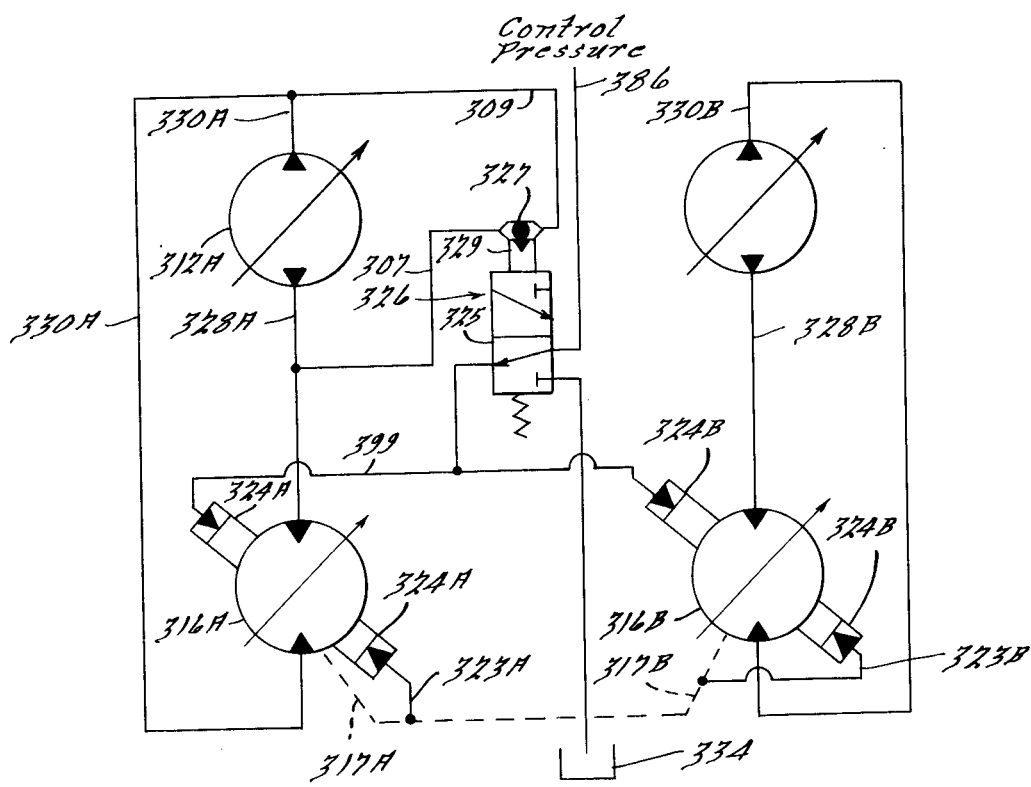

HYDROSTATIC TRANSMISSION WITH AUTOMATIC DISPLACEMENT SHIFTER

BACKGROUND OF THE INVENTION

1. Field of the Invention

The present invention relates generally to hydrostatic transmission drive systems and more specifically to such systems which employ more than one transmission.

2. Description of the Prior Art

Hydrostatic transmission drive systems are well known in the prior art. It is common in such systems to extend the output speed range of the transmission by employing a variable displacement motor in the system whose displacement may be reduced to increase drive speed without further power demand. In such systems the displacement control mechanism of the motor is normally biased to the maximum displacement position by utilizing springs. Exemplary of such systems is that disclosed in U.S. Pat. No. 3,411,297. The use of such springs has an adverse effect on the manufacturing cost of such systems.

When two independent output drives are required in a particular application such as the drive-and-steer systems employed in tracked or skid steer type vehicles, displacement control of the motors is normally effected through manual selection by the operator. Since direction and speed of the drives is also typically manually selected, the demands on operator dexterity in operating such vehicles are great.

SUMMARY OF THE INVENTION

Responsive to the deficiencies in the prior art systems, it is an object of the present invention to provide a hydrostatic transmission system in which displacement control of the motor of the system is effected without the use of resilient mechanical biasing elements.

It is another object to provide, in a multiple transmission system, means for automatically selecting the displacement of the system's motors.

According to one feature of the invention system, the motor is configured to create forces during operation tending to urge its displacement control mechanism toward a maximum displacement position and means are provided to bias the displacement control mechanism to a minimum displacement position when the motor is loaded at less than a predetermined magnitude.

According to another feature, means are provided to sense the magnitude of the load imposed upon the motors of a multiple transmission system and to permit the increase in displacement of the motors to maximum displacement upon sensing a load in excess of a predetermined magnitude.

BRIEF DESCRIPTION OF THE DRAWINGS

These and other objects and features will be apparent to those skilled in the hydraulic arts upon reading the accompanying detailed description with reference to the drawings in which like numerals refer to like parts throughout the several views and in which:

FIG. 2 is a simplified partial schematic representation of a dual hydrostatic transmission system according to the preferred embodiment of the present invention; and FIG. 3 is a simplified partial schematic representation of an alternative embodiment of dual hydrostatic transmission system according to the present invention.

DESCRIPTION OF THE PREFERRED EMBODIMENTS

Figure 1:
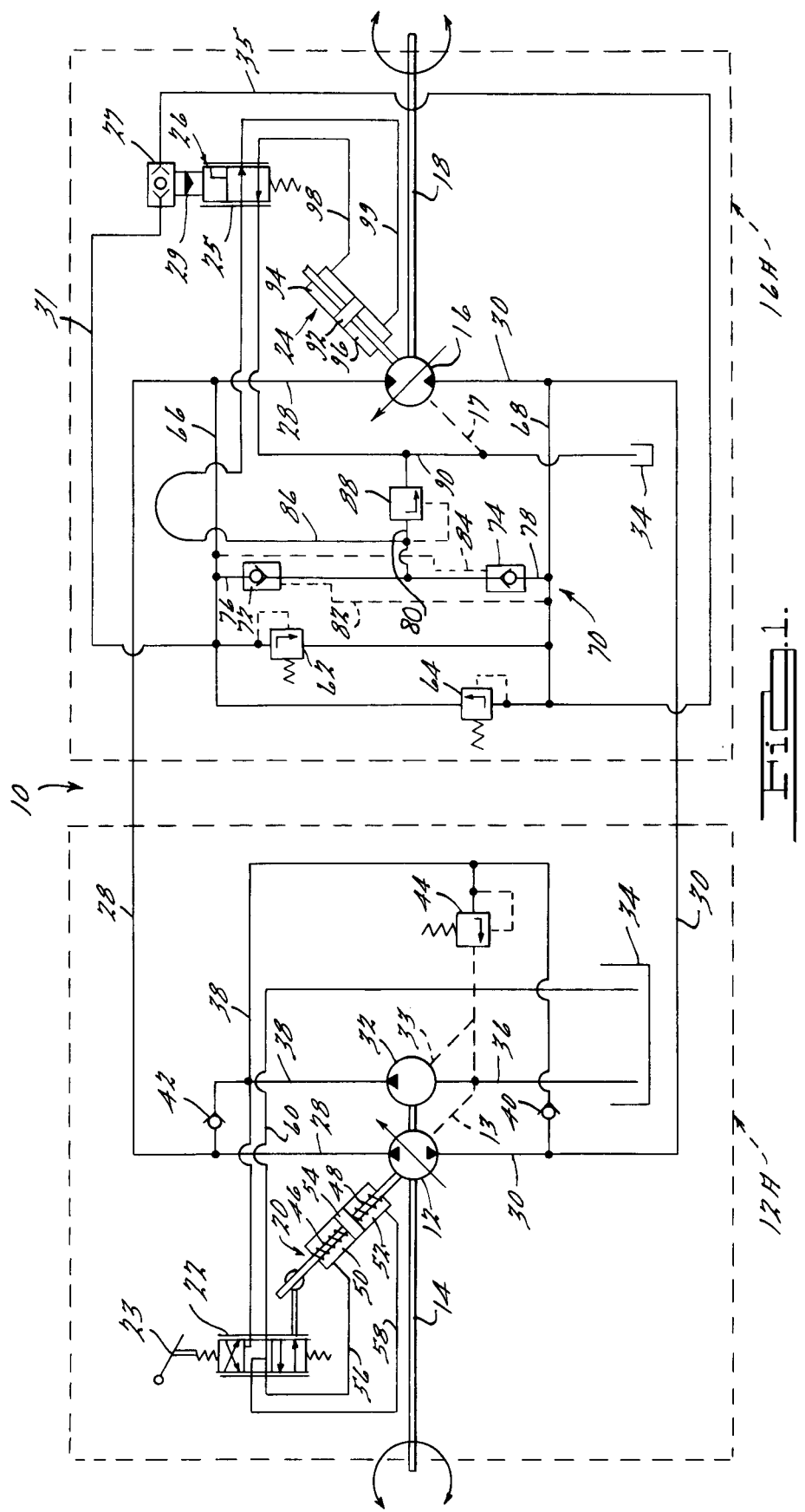
FIG. 1 is a schematic representation of a single hydrostatic transmission system according to the present invention.

Referring first to FIG. 1, the invention hydrostatic transmission system is illustrated schematically in an embodiment employing a single transmission. The single transmission system 10 is illustrated as generally including a reversible flow variable displacement pump 12 mechanically connected by a shaft 14 or similar means to a prime mover (not shown) and a variable displacement motor 16 mechanically connected by a shaft 18 or similar means to a load (not shown). Suitable valve and conduit means to be herein described permit the transfer of power from the prime mover to reversibly move the load.

A pump displacement control actuator 20 is utilized to vary the direction and rate of flow from the pump 12. Its operation is effected by use of a manually actuated selector valve 22.

A similar motor displacement control actuator 24 is utilized to vary the displacement of the motor 16. It is operated to shift to position of increased displacement, and hence motor output torque, in response to the occurrence of a predetermined loading condition sensed by an associated pressure responsive control valve 26.

Referring now to the schematic of FIG. 1 in greater detail, and particularly to that portion of the schematic designated 12A which comprises the pump portion of the transmission, the pump 12 is illustrated as being fluidly connected to first and second conduits 28 and 30 through which fluid communication with the motor 16 is effected. A positive displacement replenishment and cooling pump 32 is driven by the shaft 14 and its inlet is fluidly connected to a reservoir 34 by a conduit 36. Case drain lines 13 and 33 of the pumps 12 and 32 also are fluidly connected to the conduit 36. The outlet of the replenishment and cooling pump 32 is fluidly connected to a conduit 38, communicating with the selector valve 22 and with a first check valve 40 for permitting flow to the conduit 30. The outlet of the pump 32 is also fluidly connected to a second check valve 42 permitting flow to the conduit 28. Also is fluid communication with the conduit 38 and the case drain lines 13, 33 is a presence relief valve valve 44.

Referring now to the pump displacement actuator 20, it is schematically depicted as a double-acting piston-cylinder assemby, spring centered to a neutral position and operative to vary the displacement of the pump 12. While many configurations of displacement control mechanisms are possible, that illustrated in U.S. Pat. No. 3,812, 929 to Lauck et al. and assigned to the assignee of the present invention is illustrative of the preferred configuration, a pair of spring biased pistons arrayed to normally hold the swashplate of an axial piston pump in the zero displacement position. In the schematic representation of this mechanism in FIG. 1, springs 46, 48 are disposed in control cylinder cavities 50, 52, respectively, to the center the actuator piston 54. Cavities 50, 52 are in fluid communication with the selector valve 22 through control conduits 56, 58 respectively. Selector valve 22, which is spring centered to the position shown and which is manually positionable through use of a handle 23, is further fluidly communicated through a conduit 60 with the reservoir 34.

Referring next to that portion of the schematic of FIG. 1, designated by the numeral 16A, representing the motor portion of the transmission, the motor 16 is illustrated as being fluidly connected to the pump conduits 28, 30. A pair of high pressure relief valves 62, 64 are fluidly connected to the conduits 28, 30 through branch conduits 66, 68, respectively, to effect pressure limitation in these conduits. Also disposed fluidly between the branch conduits 66, 68 is a shuttle valve 70 illustrated schematically as comprising a pair of pressure responsive check valves 72, 74 communicating at their one ends with the conduits 66, 68 through passages 76, 78 and at their other ends with a common branch conduit 80. Sensing lines 82, 84 extend from the valves 72, 74 to communicate with the conduits 68, 66 respectively, to permit valve actuation to be later described.

Central branch conduit 80 is fluidly connected to a control pressure conduit 86 to provide communication with the pressure responsive control valve 26; it also fluidly connected to a low pressure relief valve 88, which is connected to a drain conduit 90 wherein fluid communication is provided between the pressure responsive control valve means 26, a case drain line 17 of the motor 16, and the reservoir 34.

Referrig now to the motor displacement control mechanism 24, it is schematically as a double-acting, piston-cylinder assembly mechanically engaging a portion of the motor 16 to vary its displacement. Its preferred embodiment is similar to that discussed in regard to the pump displacment control actuator 20. It is to be noted, that this mechanism is noy spring biased in the present invention as has often been the practice of the prior art. The suggested embodiment, then, employs a pair of opposed pistons for positioning a motor swashplate. This embodiment is represented schematically in FIG. 1 as a double-acting pistion 92 slidably received in a cylinder to define two control cylinder cavities 94, 96. The cavities 94, 96 are in fluid communication with a fluid metering portion 25 of the control valve 26 through control conduits 98 and 99, respectively. Fluid metering portion 25 is also fluidly connected to the drain conduit 90 and the control pressure conduit 86. A comparator portion 26, schematically illustrated as a shuttle check valve, of the control valve 26 is in fluid communication with conduits 66 and 68 through sensing lines 31 and 35, respectively.

OPERATION OF THE FIGURE 1 EMBODIMENT

Direction and rate of the output of motor is determined by positioning the selector valve 22 to port control pressure fluid to the pump displacement control actuator 20. In the neutral position shown in FIG. 1 the output of the replenishing and cooling pump 32 is blocked from the actuator 20. Control pressure is then determined by the relief valve 44 which in the preferred embodiment is set at approximately 200 psig. Movement of the selector valve 22 in the downward direction provides communication between the conduits 38 and 56 and between the conduits 60 and 58 so that control pressure fluid is supplied the cavity 50 while the cavity 52 is connected to drain. This results in movement of the piston 54 against the spring 48 to change the displacement of the pump 12 toward its maximum position. It will be assumed here that this results in flow from the pump 12 through the conduit 28. The selector valve 22 is preferably configured to provide infinitely variable metering of the fluid flowing to and from the actuator 20 so that differential pressure across the piston 54 and hence pump displacement is proportional to travel of the selector valve 22.

Upward movement of the selector valve 22 reverses the communication between the conduits 56, 58, 38, and 60 to reverse the flow of the pump 12, pressurizing the conduit 30. In either direction of operation cooling and make-up flow is provided to the unpressurized conduit 28 or 30 from the pump 32 through check valves 42 or 40.

Many variations in the design of the variable pump portion 12A of the invention hydrostatic transmission system 10 are possible, and the one herein described is intended to be merely illustrative of one such system commonly used.

Turning now to the operation of the variable motor portion 16A of the invention hydrostatic transmission system 10, the description will proceed with the assumption that the selector valve 22 is in the downward position pressurizing the conduit 28.

In this mode of operation the pressure of the fluid supplied the motor 16 through conduit 28 is limited by operation of the high pressure relief valve 62 to 6000 psig. Upon sensing the pressure in conduit 28 through conduit 66 and sensing line 84, check valve 74 of shuttle valve 70 is opened to permit communication between the motor outlet conduit 30 and the central branch conduit 80. Communication is thereby provided with the control conduit 86 which is fluidly connected to the control valve 26. Pressure in this control circuit is limited by operation of the low pressure relief valve 88 to a value less than that set by the pump circuit relief valve 44, preferably to 160 psig. Reverse operation of the shuttle valve 70 and the high pressure relief valves 62, 64 would, of course, be effected by reversal of the position of the selector valve 22.

With the control valve 26 in the position shown, fluid from the control conduit 86 is ported through conduit 99 to the control cylinder cavity 96 of the motor displacement control actuator 24 to place the motor 16 in its minimum displacement position. Control cylinder cavity 94 is simultaneously ported to the reservoir 34 through conduits 98 and 90. It will be appreciated by those skilled in the hydraulic arts that the pressure biasing described is effective to overcome the forces naturally created in a common type of hydraulic motor, particularly one of the preferred axial piston design, tending to drive its displacement control mechanism to a maximum displacement position. Chief among these forces in the preferred design are the pressure and piston inertia reaction forces acting on the swashplate.

The control valve 26 is configured to achieve the full biasing position described when the load on the motor 16, as indicated by the pressure in the motor inlet conduit 28 or 30, is less than a predetermined magnitude less than the maximum pressure setting of the high pressure relief valves 62, 64. It is movable from this position toward the second valve position indicated schematically, in which control pressure fluid from the conduit 80 is blocked and the actuator 24 is communicated with the reservoir 34. Sensing this load is accomplished through use of the comparator portion 27 of the control valve 26 which compares the pressures in conduits 28 and 30 and ports the higher pressure signal to an actuator portion 29 to vary the pressure differential across the pistion 92 in response to changes in load above the predetermined magnitude. The motor forces previously described then operate to position the actuator 24 at a motor displacement position sufficient to maintain the pre-set pressure level until it reaches maximum displacement. The change in motor displacement from minimum to maximum results in an increase in motor torque and a decrease in motor speed responsive to the load imposed. The suitability of this response is enhanced by the choice of the operating pressure of the control valve 26 since it provides a relatively high level of pressure related motor forces for positioning the displacement control 24. The imposition of greater loads once the motor 16 has reached its maximum displacement results in an increase in differential pressure across the motor until the limit imposed by the high pressure relief valves 62, 64 is reached.

While the operation of the transmission system has been described with the assumption that the conduit 28 is pressurized, it will be obvious to those skilled in the art that operation in the reverse condition with conduit 30 pressurized is essentially identical.

DESCRIPTION OF THE FIGURE 2 EMBODIMENT

The novel means for controlling the output torque and speed of the motor 16 of the hydrostatic transmission system 10 described in the discussion of the FIG. 1 embodiment is capable of being utilized to great advantage in a dual transmission system. It permits, in fact, the design of the dual hydrostatic transmission system in which shifting of motor displacement is effected automatically in response to changes in load. This is a particularly attractive feature in such systems used for driving and steering tracked or skid steer vehicles.

Referring now to FIG. 2. A dual hydrostatic transmission system 210 employing the invention automatic displacement shifting control of FIG. 1 is illustrated in simplified schematic form. It includes a pair of hydrostatic transmission systems, each including a variable displacement pump 212A and 212B a variable displacement motor 216A and 216B. Each pump motor combination is interconnected by suitable conduits as was described with respect to the FIG. 1 embodiment, and the two systems are operationally interconnected by a control valve 226 essentially identical to the control valve 26 of the FIG. 1 embodiment. This operational connection is effected through the use of a pair of shuttle check valves 201, 202 which are fluidly connected across the pumps 212A and 212B and fluidly connected to the comparator section 227 of the control valve 226. In the vehicular application mentioned the pumps 212a and 212B are both driven by the vehicle engine (not shown), and the motors 216 A and 216 B are drivingly connected to the drivewheels of the vehicle on opposite sides of the vehicle longitudinal center line.

OPERATION OF THE FIGURE 2 EMBODIMENT

During light loading conditions such as would be present during opertion of the tracked or skid steer vehicle in a straight line over even terrain, the control valve 226 assumes the position shown in FIG. 2. By manual selection as was described in the FIG. 1 embodiment, the pumps 212A and 212B are put into a condition in which pressurized fluid is supplied at the selected rate through one of the pump conduits of each pump. That is, either conduits 228A and 228B or conduits 230 A and 230 B would be pressurized to drive the motors 216A and 216B in the same direction. When in this condition control pressure developed in control pressure conduit 286 is ported through the control valve 226 to the conduit 299 to bias the motor displacement control actuators 224A and 224B to minimum displacement.

It will be noted here that the motors 216A and 216B illustrated in the simplified schematic view as including a pair of opposed displacement control cylinders 224A and 224B pair of opposed displacement control cylinders 224A and 224B and that cylinder which in each case opposes motion to the minimum displacement position is connected to the case drain line 217A and 217B of the motors 216A and 216B. It will, of course, be clear that this connection to the case drain lines is equivalent to the connection of the conduit 98 to the reservoir 34 through the valve 26 in the FIG. 1 embodiment.

Upon the occurrence of a change in load in excess of the predetermined magnitude previously discussed, the control valve 226 is operative to effect a change in displacement of the motors 216A and 216B toward the maximum displacement position. Such a change in load may occur through the reversal of one or both of the pumps 212A and 212B during the occurrence of high loading as by the engagement of one or both of the motors with a high load in the mentioned vehicular application. The loading condition is sensed through the operation of the shuttle check valves 201 and 202 and the comparator portion 227 of the control valve 226. Check valve 201 senses the pressure in conduits 228A and 230A through sensing lines 204 and 203, respectively. It ports the higher of these two pressures, indicative of the direction of operation of the pump 212 and of the load imposed on the motor 216A, to the comparator portion of 227 through conduit 207. Shuttle check valve 202 similarly senses the difference in pressure between conduits 228B and 230B through sensing lines 206 and 205, respectively, and ports the higher pressure signal, indicative of the direction of operation of the pump 212B and of the load imposed on the motor 216B, through circuit 208 to the comparator portion 227 of the control valve 226. Comparator portion 227 in turn directs the higher of the two signals supplied through conduits 207 and 208 to the actuator portion 229. When this higher signal pressure exceeds a predetermined magnitude, the fluid directing portion 225 of the control valve 226 shifts from the position shown in FIG.2 toward the position in which fluid from the control pressure conduit 286 is blocked, and fluid from the motor displacement control actuators 224A and 224B is exhausted through the conduit 299 to the reservoir 234 through the control valve 226. During this mode of operation, displacement of both motors 216A and 216B is automatically shifted in response to load. The dual hydrostatic transmissions system of FIG. 2, then, provides advantageously for the automatic matching of the transmission outputs to the load imposed without manually input from the operator beyond the selection of the direction of rate of flow of the pumps 212A and 212B. The freedom of operation that this affords the driver in a vehicular application as has been previously mentioned should be clear.

THE FIGURE 3 EMBODIMENT

In FIG. 3 a simplified schematic representation of a modification of a FIG. 2 embodiment is disclosed. Operation is identical to that of the FIG. 2 embodiment with one exception. The comparator section 327 of the control valve 326 is fluidly connected to directly compare the difference in pressure between the conduits 330A and 328A and to transmit the higher pressure signal to the actuator portion 329. This lower cost approach eliminating two shuttle check valves may be taken when the load parameters of a particular system are known to not require the selection afforded users of the system disclosed in FIG. 2. In the vehicular system previously discussed, for example, high motor loads imposed on the motor 316B which is not connected to the control valve 226 will be reflected mechanically to the vehicle to the motor 316A at which point the valve 326 will function in the manner previously described. The response delay created by the fact that only one transmission load is sensed in this type of system has been found to be insignificant. It will be further obvious from the description that the comparator section 327 can be fluidly connected to sense the difference in pressure between the two pairs of motors, that is, connected between conduits 328A and 328B or 330A and 330B. Such a modification may be used when in a particular application it is known that high loading conditions occur in only one direction.

For a skid steer or tracked vehicle application in which such unidirectional loading is known, comparator section 327 could be eliminated altogether and one of the highly loaded motor conduits could be sensed directly.

While the present invention has been disclosed in only certain embodiments, others will be obvious to those skilled in the art of hydrostatic transmissions.

What is claimed is:

1. A hydrostatic transmission system comprising:
   a. a fluid reservoir;
   b. first and second variable displacement pump means;
   c. first and second variable displacement motor means each including displacement control means operable to vary the displacement of said motors between a maximum displacement and a minimum displacement;
   d. first fluid conduit means interconnecting said first pump means with said first motor means, second fluid conduit means interconnecting said second pump means with said second motor means, and third fluid conduit means interconnecting said reservoir with said first and second pump means;
   e. means associated solely with said first fluid conduit means to sense the magnitude of the load imposed on said first motor means; and
   f. motor displacement shifting means for each motor means to:
      1. bias said motor displacement control means to the minimum displacement position; and
      2. shift, upon sensing the application of a load on said first motor means in excess of a predetermined value, both of said motor displacement control means toward the mximum displacement position.

2. A transmission system as defined in claim 1 wherein:
   A. each of said motor displacement control means comprises single acting fluid motor means operative to move between a position wherein said variable displacement motor means is at a maximum displacement and a position wherein said variable displacement motor means is at a minimum displacement;
   B. said motor displacement shifting means comprises:
      1. a source of control pressure fluid;
      2. pressure responsive valve means fluidly connected to said source of control pressure fluid, said fluid motor means, and said reservoir, and movable in response to a pressure signal in excess of a predetermined value, said pressure signal being representative of the load imposed on said first motor means, from:
         a. a first position wherein fluid communication is provided between said source of control pressure and both said fluid motor means to urge said fluid motor means to said minimum displacement position;
      toward
         b. a second position wherein fluid communication is provided between both said fluid motor means and said reservoir to permit movement of said fluid motor means toward said maximum displacement position.

3. A transmission system as defined in claim 1, wherein said variable displacement motor means are of the type wherein forces generated during the operation thereof tend to urge said displacement control means to a position of maximum displacement.

4. A hydrostatic transmission system comprising:
   A. a fluid reservoir;
   B. first and second variable displacement pumps, and means interconnecting said reservoir to said first and second variable displacement pumps;
   c. first and second variable displacement motors, each including displacement control means operable to vary the displacement of said motors between a maximum displacement and a minimum displacement and each motor being of the type wherein forces generated during the operation thereof tend to urge said displacement control means to a position of maximum displacement;
   D. fluid means interconnecting said first pump with said first motor and said second pump with said second motor;
   E. means for providing a source of control pressure fluid; p1 F. pressure responsive valve means movable in response to a pressure signal of a given magnitude from:
      1. a first position wherein fluid communication is provided between said source of control pressure fluid and both said displacement control means to urge said displacement control means to the minimum displacement position;
   toward
      2. a second position wherein fluid communication is provided between said reservoir and both said displacement control means to permit movement thereof toward the maximum displacement position in response to a pressure signal in excess of a predetermined value; and
   G. Valve means for transmitting said pressure signal representative of the load imposed on only said first motor to said pressure responsive valve means.

* * * * *

UNITED STATES PATENT AND TRADEMARK OFFICE
CERTIFICATE OF CORRECTION

PATENT NO. : 4,040,254
DATED : August 9, 1977
INVENTOR(S) : Kenneth K. Knapp; Wm. E. Koch It is certified that error appears in the above-identified patent and that said Letters Patent are hereby corrected as shown below:

Col. 2, line 46: "is" should read "in".
line 47: "presence" should read "pressure".
line 49: After "displacement" insert "control".
Col. 3, line 19: After "it" insert "is".
line 25: "Referrig" should read "Referring".
line 26: After "is" insert "depicted".
line 31: After "noted" insert "however" and "noy" should read "not".
line 36: "pistion" should read "piston".
Col. 4, line 65: "pistion" should read "piston".
Col. 5, line 46: Before "fluidly" insert "are".
line 48: "212a" should read "212A".
line 57: "opertion" should read "operation".
Col. 6, line 3: After "216B" insert "are".
lines 6-7: Delete "pair of opposed displacement control cylinders 224A and 224B" as they are a repeat.
line 37: "circuit" should read "conduit".

line 55: "mximum" should read "maximum".
Col. 8, line 33: "c" should read "C"
line 41: After "fluid" insert "conduit".

UNITED STATES PATENT AND TRADEMARK OFFICE
CERTIFICATE OF CORRECTION

PATENT NO. : 4,040,254
DATED : August 9, 1977
INVENTOR(S) : Kenneth K. Knapp; Wm. E. Koch It is certified that error appears in the above-identified patent and that said Letters Patent are hereby corrected as shown below:

Col. 8, line 45: Delete "pl" and "F" starts a new paragraph.

Signed and Sealed this

Twenty-fourth Day of January 1978

[SEAL]

Attest:

RUTH C. MASON
*Attesting Officer*

LUTRELLE F. PARKER
*Acting Commissioner of Patents and Trademarks*